DIGITAL SHIFT REGISTER USING OUTPUT TRANSFORMER
OVERSHOOT PULSE AS SEQUENCING TRIGGER PULSE
Original Filed March 30, 1959

INVENTOR
CYRUS J. CREVELING

BY Richard C. Reed
ATTORNEY

United States Patent Office 3,158,753
Patented Nov. 24, 1964

3,158,753

DIGITAL SHIFT REGISTER USING OUTPUT TRANSFORMER OVERSHOOT PULSE AS SEQUENCING TRIGGER PULSE

Cyrus J. Creveling, Oxon Hill, Md., assignor to the United States of America as represented by the Secretary of the Navy Continuation of abandoned application Ser. No. 803,036, Mar. 30, 1959. This application July 28, 1961, Ser. No. 132,256
3 Claims. (Cl. 307—88.5)
(Granted under Title 35, U.S. Code (1952), sec. 266)

The invention described herein may be manufactured and used by or for the Government of the United States of America for governmental purposes without the payment of any royalties thereon or therefor.

This application is a continuation of the application Serial No. 803,036 which was filed by Cyrus J. Creveling on March 30, 1959 now abandoned.

This invention pertains to digital shift registers and more particularly to digital shift registers which include gated amplifiers.

In a shift register, delay and quantizing in both amplitude and time are essential. Prior shift registers accomplished the quantizing with regenerative amplifiers and the delay was accomplished by analog delay lines. The analog delay lines suffer from lack of precision since their output depends upon the values of their parameters which are temperature sensitive and change with age. Further, analog delay lines are expensive.

It is therefore, an object of this invention to provide a shift register which does not require an analog delay line.

Another object of this invention is to provide a shift register which enjoys freedom from changing values of the parameters of the circuit while undergoing temperature changes.

Still another object of this invention is to provide a shift register which experiences a minimum change of parameters as a result of aging.

A further object of this invention is to provide a shift register which is relatively inexpensive when compared with the prior shift registers.

Other objects and many of the attendant advantages of this invention will be readily appreciated as the same becomes better understood by reference to the following detailed description when considered in connection with the accompanying drawings wherein.

Figures 1, 2, 3, 4:
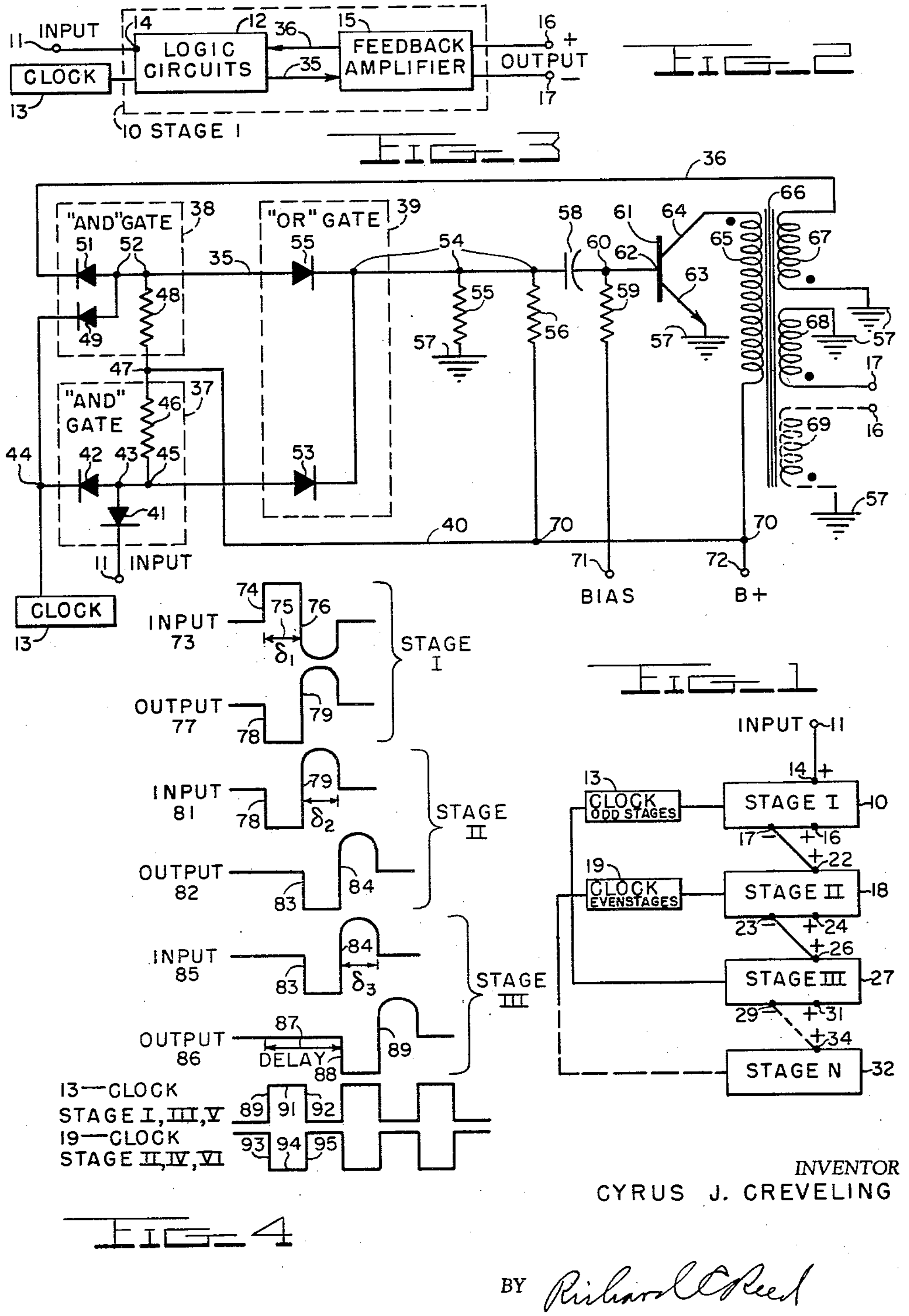
FIG. 1 shows, in block diagram form, the complete shift register of this invention.
FIG. 2 shows, in block diagram form, one of the stages of the shift register.
FIG. 3 shows a schematic diagram of a typical circuit of one of the stages of the shift register of this invention.
FIG. 4 shows idealized typical waveforms which are representative of the operation of the shift register of this invention.

Briefly, the circuit of this invention is a shift register which includes a plurality of gated amplifiers connected in cascade. A pair of "and" gates are connected in such a manner that the inputs for one of the "and" gates includes a clock pulse and a triggering pulse, while the inputs for the other of the "and" gates includes the clock pulse and a feedback pulse. The outputs of the two "and" gates form the inputs for an "or" gate. The output of the "or" gate is the control means for an amplifier which provides the above-said feed-back pulse and an output signal. The "and" gates are operative in response to triggering pulse of a preselected polarity, and are inoperative during the absence of such preselected polarity. The required sequential operation of the several gated amplifiers to enable the chain of stages to be a shift register is provided by the application of the output of one stage to the input of the next stage in the following manner. Since the several gated amplifiers are polarity sensitive, the full wave output of the first stage is selected so that the half wave which is first applied at the input of the second stage is of the polarity which was not selected to operate the gates. The half wave delay in the application of the proper polarity to operate the gates provides the desired sequential operation of a shift register.

Referring now to the drawings, wherein like reference numerals designate like structure throughout the several figures, FIG. 1 shows in block diagram form a complete digital register. The several stages I, II, III and N, represented by the numbers 10, 18, 27 and 32 respectively, are identical in structure. It is to be noted that the inputs and the outputs for the several stages are symbolically represented to indicate that each stage is operatively responsive to a positive going input pulse and that the output of each stage taken at a negative terminal provides a half-wave phase shift of the positive going component thereof to provide the delay which is necessary for the sequential operation of the shift register. Clock 13 is provided to trigger the odd numbered stages and clock 19 is provided to trigger the even numbered stages. An output is available at the outputs 16, 24 and 31 which is in phase with the full wave inputs applied at input 14. The inputs 14, 22, 26 and 34 represent the capability of each of the stages being triggered by a positive going pulse. The outputs 17, 23 and 29 are shown with a negative sign to indicate that such outputs are inverted, mirror image signals of the input signal applied at input 14, the signal at input 22 is 180° out of phase with the signal at output 23, the signal at input 26 is 180° out of phase with the signal at output 29. The application of the inverted signal available at an output of each stage, being applied to the positive going responsive input of the succeeding stage, provides the phase shift to give the delay which is necessary for the proper shift register operation.

FIG. 2 shows in block diagram form the circuit of each of the stages of the shift register; stage I, as represented by numeral 10, being typical. The input trigger pulses are applied at input 11 to the logic circuits which are designated generally by number 12. Also, connected to the logic circuits 12 is clock 13. The logic circuits are so selected that the magnitude of the clock pulse alone or the magnitude of the input pulse alone is insufficient to operate the logic circuit. It is necessary that signals at input 11 and clock 13 occur simultaneously in order that the logic circuits 12 operate. The operation of logic circuits 12 provides an output through lead 35 to the feedback amplifier 15. The operation of the feedback amplifier is such that when an output thereof is fed back through lead 36 to the logic circuit 12, the duration of the operation of the feedback amplifier will provide operation of the logic circuits so that the circuits will operate during the entire clock pulse width. This provides for quantizing of the input of a positive going signal of less duration than the clock pulse width. Upon the completion of the clock pulse, the feedback signal alone through lead 36 will not keep the logic circuits operative and, therefore, the operation of the stage is completed. During the operation of the feedback amplifier 15, an output is available at terminals 16 and 17. The plus sign at terminal 16 is to indicate that the first half cycle of such output is positive going, whereas the negative sign at terminal 17 indicates that the first half wave at that terminal of the output of the feedback amplifier is a negative going signal. The output of the feedback amplifier is a full wave output signal, because of the overshoot which is caused by the collapse of the flux in the output transformer after the direct pulse is completed.

FIG. 3 shows the details of the logic circuits 12 and the feedback amplifier 15. The logic circuits are shown generally as an "and" gate 37, another "and" gate 38 and an "or" gate 39. The two "and" gates and the "or" gate are so connected as to provide an output whenever the input signal applied at input terminal 11 coincides with the clock pulse provided by clock 13, or when the feedback from the amplifier which is provided by winding 67 on the transformer 66 through the feedback connection 36 to the second "and" gate 38 coincides with the clock pulse applied by clock 13. The input 11 is connected to the cathode of a diode 41, the anode of which is connected to a junction 43. Clock 13 is connected through a junction 44 to the cathode of a second diode 42, the anode of which is connected to the same junction 43 as the first diode 41. The anode of a third diode 53 is also connected to junction 43 in the first "and" gate 37. This third diode 53 is one of the diodes of the "or" gate 39. The second diode of the "or" gate 39 is numbered 55. The cathode of diode 55 is joined to the cathode of diode 53 at junction 54. The second "and" gate 38 includes two diodes 49 and 51, respectively, the anodes of which are connected at junction 52. The cathode of diode 49 is connected to junction 44 to which is also connected to clock 13. The cathode of diode 51 is connected to the feedback connection 36 which is connected to winding 67 on the transformer 66 in the amplifier. Also connected to junction 52 is the anode of diode 55 which is a part of the "or" gate 39. Also provided is a B plus power source connected at terminal 72 through junction 70 to a junction 47. A resistor 46 is connected between junctions 47 and 43 and a resistor 48 of like value is connected between junction 47 and junction 52 in the "and" gate 38. This provides the necessary potential to assure the proper operation of the diode gates. The potential at junction 54 is clamped at a level determined by the potential drop across a resistor 55 which is connected between junctions 54 and ground 57. Resistors 55 and 56 form a voltage divider which is like the voltage divider formed by resistors 46, 48 and 55 so as to establish a B plus level by raising the threshold of operation which will cause the several diodes to reject superfluous signals.

A terminal 60 is provided, as is a resistor 59 and a negative bias source 71. Connected between terminals 60 and bias source 71 is the resistor 59. Connected between terminals 54 and 60 is a capacitor 58 which rejects the direct current components of the signals applied thereto. The feedback amplifier includes a transistor 61; the base 62 of which is connected to junction 60, the emitter 63 of which is connected to ground 57, and the collector of which is connected to the dotted end of a driving winding 65 on a core 66. The not dotted end of winding 65 is connected to junction 70 and to the B plus power source 72. An output winding 68 is provided on the core 66. The not dotted end of the winding 68 is connected to ground. The dotted end of winding 68 is connected to an output terminal 17. A second output winding 69 is connected at its dotted end to ground 57 and at its not dotted end to output terminal 16. Winding 69 is shown in dotted lines to accentuate the fact that the selected output is one which provides a polarity which is in opposition to the polarity of the feedback signal. The output which is available at terminal 17 is polarized such that the positive going portion of the full wave output signal occurs at a time later than the beginning of the output signal. Such time is at the termination of the clock pulse and is provided by the collapse of the overshoot of the flux in the transformer core 66.

It is understood that the polarity of all of the polarity sensitive elements of the circuit as well as the input and clock signals and the negative bias and B plus sources can be reversed without departing from the invention. The operation of the circuit would be unaltered.

The simultaneous application of a positive, for example, going signal at input 11 and a like polarized clock signal would result in the operation of the "and" gate 37 to provide a signal through junctions 43, 45, diode 53, junction 54, capacitor 58, junction 60 to the base 62 of n-p-n transistor 61 to render transistor 61 conductive. An output appears at terminal 17, and a feedback pulse is conducted through lead 36 upon the flow of current from B plus source 72 through winding 65 and transistor 61 to ground which is provided by the conductivity of transistor 61. The feedback pulse through lead 36 is applied simultaneously with the like polarized clock signal to the "and" gate 38 to provide operation of the stage until the termination of the clock signal.

FIG. 4 shows the waveforms of the operation of the circuit. For stage I, the input signal 73 which is applied at input 11 to terminal 14 is shown as a quantized signal. It need only be a positive going signal of any configuration of such magnitude that when it is combined with the clock signal 89, 91, 92, the resultant magnitude is sufficient to operate the gate 37. The plus sign at terminal 14 indicates that stage I is responsive to a positive going signal. The part of the input signal 73 that triggers the operation of stage I is the positive going portion 74. The feedback pulse then keeps the circuit in operation during the maintenance of the clock pulse 91 until the cut-off 92 of the clock pulse. Upon the closing of the "and" gates, the collapse of the overshoot of the flux level in the output transformer 66 caused by the termination of the pulse from the logic circuits provides the rise 79 in the output 77 of stage I. It is this positive going portion 79 that provides the operation of stage II at a time which differs from the operation of stage I by $\delta_1$, which is, incidentally, a clock pulse length.

A threshold voltage level is provided by the voltage dividers at junction 54. This threshold level assures that the proper signal strength be applied to the inputs of the gates for proper operation. The bias voltage source 71 is provided should a transistor be selected which requires a bias for assured cut-off of such transistor. Such bias is not required by some transistors that are available.

It is seen that the circuit of this invention is a very stable digital shift register which provides accurate quantizing and delay without an analog delay line and without excessive expense.

Obviously many modifications and variations of the present invention are possible in the light of the above teachings. It is therefore to be understood that within the scope of the appended claims the invention may be practiced otherwise than as specifically described.

What is claimed is:

1. A digital shift register comprising first and second cascaded stages, each having an input and an output, each stage comprising an "or" gate having an output and at least two inputs, first and second "and" gates, each having an output and at least two inputs, the output of said first "and" gate connected to one of said "or" gate inputs and the output of said second "and" gate connected to another of said "or" gate inputs, a clock pulse source connected to one input of each of said first and second "and" gates, a regenerative amplifier connected to the output of said "or" gate, output means at the output of said first stage connected to said second stage for producing an output signal and an overshoot pulse, said overshoot pulse being produced at a time later than the beginning of said output signal, feedback circuit means connected between said output means and said second "and" gate, means in said second stage responsive to said overshoot pulse for operating said second stage at a time differing from the time of operation of said first stage by a time delay which is equal to a clock pulse length, whereby a shift is provided by each stage.

2. The digital shift register of claim 1 in which the regenerative amplifier of each stage comprises a transistor having a collector, an emitter and base, said transistor having its emitter grounded, its collector connected to said output means, and its base connected to the output of said "or" gate, and means for biasing said transistor including a biasing resistor connected to said base.

3. A digital shift register comprising first and second cascaded states, each stage having an "or" gate having an output and at least two inputs, first and second "and" gates, each having an output and at least two inputs, the output of said first "and" gate connected to one of said "or" gate inputs and the output of said second "and" gate connected to another of said "or" gate inputs, a clock pulse source connected to one input of each of said first and second "and" gates of said first stage, a regenerative amplifier comprising a transistor having a collector, an emitter and base, said transistor having its emitter grounded and its base electrically connected to the output of said "or" gate, means for biasing said transistor including a biasing resistor connected to said base, a transformer having output windings and an input winding, said collector being connected to said transformer input winding, and one of said transformer output windings connected to another input of said second "and" gate to form a feedback circuit for providing a pulse of proper polarity for triggering said second "and" gate, another of said transformer output windings connecting said first stage to said second stage, said transformer of said first stage comprising means for developing an overshoot pulse for triggering the first "and" gate of said second stage whereby a shift is provided by each stage.

References Cited in the file of this patent

UNITED STATES PATENTS

| | | |
|---|---|---|
| 2,901,605 | Raymond et al. | Aug. 25, 1959 |
| 2,918,587 | Rector et al. | Dec. 22, 1959 |
| 2,989,651 | Smith | June 20, 1961 |
| 3,011,066 | Vogelsong | Nov. 28, 1961 |
| 3,018,393 | Levy et al. | Jan. 23, 1962 |
| 3,026,427 | Chisholm | Mar. 20, 1962 |
| 3,032,663 | Tillman | May 1, 1962 |

OTHER REFERENCES

"Digital Computer Components and Circuits," by R. K. Richards, pages 111–113 © 1957 D. Van Nostrand Co., Inc.